United States Patent
Roos et al.

(10) Patent No.: US 8,552,097 B2
(45) Date of Patent: Oct. 8, 2013

(54) POLYMER VULCANIZATE AND PROCESS FOR THE PRODUCTION THEREOF

(75) Inventors: Andreas Roos, Dusseldorf (DE); Martin Mezger, Burscheid (DE); Hans Magg, Kurten (DE); Stefan Kelbch, Much (DE); Joachim Haider, Cologne (DE); Gerd Bergmann, Cologne (DE)

(73) Assignee: LANXESS Deutschland GmbH, Cologne (DE)

( * ) Notice: Subject to any disclaimer, the term of this patent is extended or adjusted under 35 U.S.C. 154(b) by 806 days.

(21) Appl. No.: 12/275,292

(22) Filed: Nov. 21, 2008

(65) Prior Publication Data

US 2009/0163631 A1    Jun. 25, 2009

(30) Foreign Application Priority Data

Nov. 30, 2007 (EP) .................................... 07122012

(51) Int. Cl.
*C08K 5/17* (2006.01)

(52) U.S. Cl.
USPC .............. 524/254; 524/87; 524/257; 524/424

(58) Field of Classification Search
USPC ............................ 524/424–427, 254, 257, 87
See application file for complete search history.

(56) References Cited

U.S. PATENT DOCUMENTS

| | | | |
|---|---|---|---|
| 6,207,794 B1 | 3/2001 | Yamasaki et al. | |
| 6,214,922 B1 | 4/2001 | Campomizzi | |
| 6,495,653 B1 * | 12/2002 | Kinsho | 528/73 |
| 6,946,526 B2 | 9/2005 | Guerin et al. | |
| 2002/0072557 A1 | 6/2002 | Arnoldi et al. | |
| 2004/0110905 A1 * | 6/2004 | Kubota et al. | 525/329.7 |

FOREIGN PATENT DOCUMENTS

GB    1558491    1/1980

OTHER PUBLICATIONS

European Search Report from co-pending Application EP08169326 dated Nov. 18, 2010, 6 pages.

* cited by examiner

*Primary Examiner* — Peter D Mulcahy
(74) *Attorney, Agent, or Firm* — Nicanor A. Kohncke

(57) ABSTRACT

A new polymer composition comprising
 (i) a polymer having a main polymer chain derived from
  (ia) at least 30% by weight to 100% by weight based on the polymer of a first monomer which introduces at least one of a secondary carbon and a tertiary carbon to the main polymer chain, and
  (ib) in the range of from 0 to 70% by weight based on the polymer of at least one other monomer;
 (ii) at least one lithium salt; and
 (iii) at least one antioxidant is provided, as well as a process for producing a polymer vulcanizate comprising the step of vulcanizing the polymer composition mentioned above additionally comprising a vulcanization system. A method for improving the hot air aging and aqueous fluid resistance characteristics of the polymer mentioned above comprises the step of admixing said polymer with at least one lithium salt and at least one antioxidant is also provided.

17 Claims, 1 Drawing Sheet

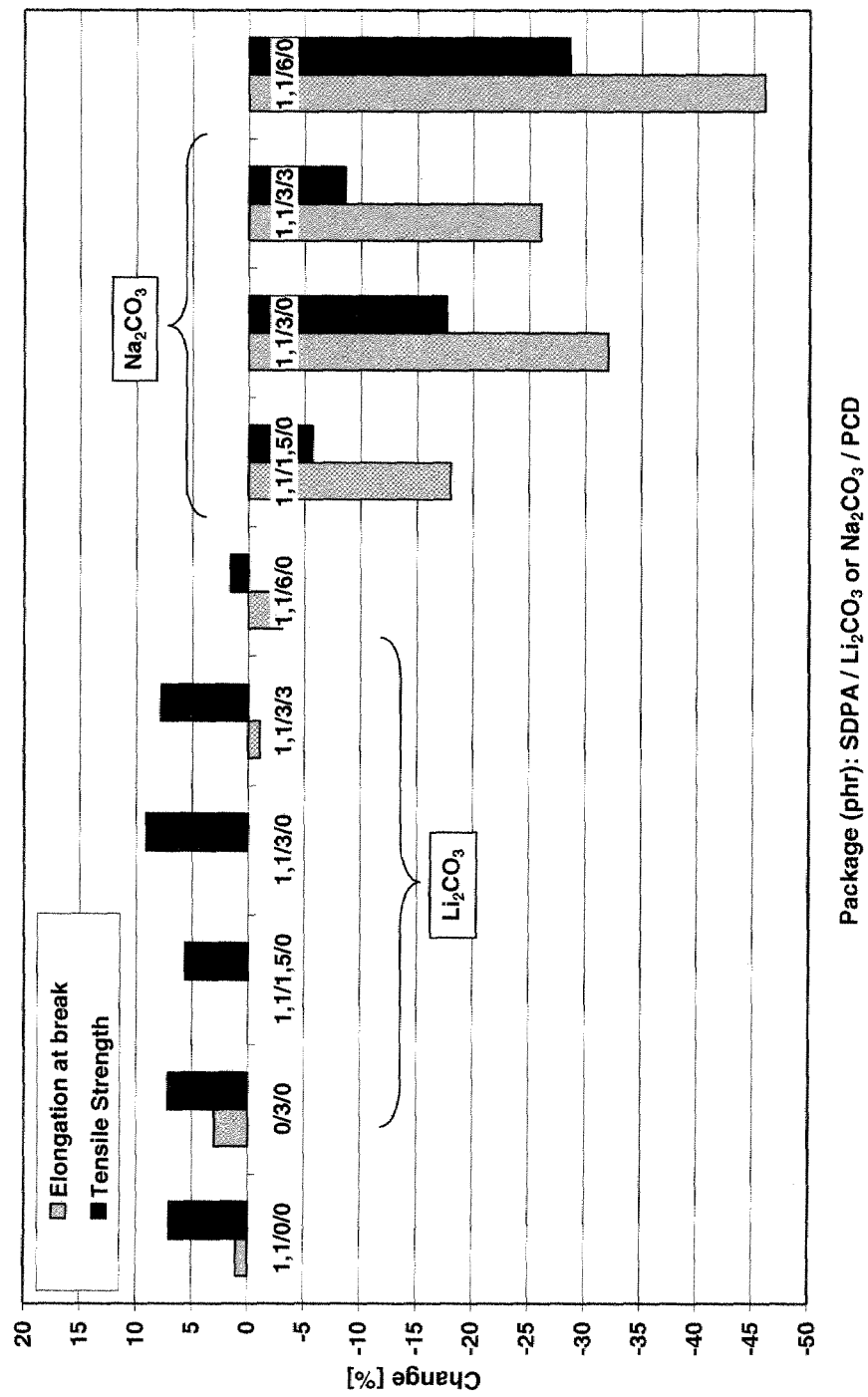

POLYMER VULCANIZATE AND PROCESS FOR THE PRODUCTION THEREOF

FIELD OF THE INVENTION

The present invention relates to an improved polymer vulcanizate and to a process for the production thereof based on a novel polymer composition. More particularly, in one of its aspects, the present invention relates to nitrile polymer vulcanizates having improved hot air aging characteristics combined with an improved swelling resistance to aqueous media. In another of its aspects, the present invention relates to a polymer composition useful to produce such vulcanizates. In yet another of its aspects, the present invention relates to a method for improving the hot air aging characteristics and at the same time the swelling resistance to aqueous media of a nitrile polymer vulcanizate.

BACKGROUND OF THE INVENTION

The effects of oxidizing conditions on vulcanizates obtained from polymers having carbon-carbon double bond unsaturation have long been a problem, particularly in applications where the vulcanizates are exposed to elevated temperatures for extended periods of time. A variety of approaches have been developed in the art in an attempt to solve this problem.

It is known that the carbon-carbon double bonds of such polymers activate the vulcanizate to oxidative attack. One solution to the problem of oxidative attack is to use polymers with few or no carbon-carbon double bonds. Examples of such polymers include butyl rubber (copolymers of isobutylene and isoprene) which typically contain from about 0.5 to about 3.0 mole percent of carbon-carbon double bond unsaturation, and ethylene-propylene copolymers which contain no such unsaturation.

Certain applications, such as the various hoses and seals in the engine compartment of automobiles, require vulcanized polymers with a combination of oil resistance, and resistance to oxidative attack in air at elevated temperatures for extended periods of time. Vulcanizates of copolymers of conjugated dienes and α,β-unsaturated nitrites, such as acrylonitrile-butadiene copolymer, commonly known as nitrile rubber or NBR, are well known for their oil resistance. However, they contain carbon-carbon double bond unsaturation and therefore are susceptible to oxidative attack unless subjected to special compounding procedures for the production of oxidation resistant vulcanizates.

In order to reduce the amount of carbon-carbon double bond unsaturation in NBR and yet retain the copolymer's oil resistance which is thought to be provided by the nitrile functional groups in the copolymer, methods have been developed to selectively hydrogenate the carbon-carbon double bond unsaturation of NBR without hydrogenating the nitrile groups to produce hydrogenated NBR or HNBR. Such hydrogenation is e.g. disclosed in British patent 1,558,491, the contents of which are hereby incorporated by reference. A review by Tan et al. Rubber Chem. Tech. (2005), 78(3), 489-515 gives a comprehensive overview in this technical field.

While the development of HNBR has been a significant advance in the art, there is still room for improvement.

Campomizzi et al. (U.S. Pat. No. 6,214,922) have successfully demonstrated that the usage of a combination of antioxidants with bases significantly improves the hot air aging characteristics of hydrogenated nitrile vulcanizates. One preferred combination includes the usage sodium carbonate which has given the best results so far.

Other publications in the field are e.g. Arnoldi et al. (US 2002/072557 A1), wherein anti-aging agents for organic polymers based on salts of sterically hindered phenolic compounds with at least two phenolic OH groups are disclosed.

However, even though the vulcanizates mentioned in U.S. Pat. No. 6,214,92 (Campomizzi) are very useful for high temperature applications, when the vulcanizates mentioned in U.S. Pat. No. 6,214,92 are in contact with aqueous media, especially water, high swelling is observed limiting the usage of sodium carbonate for high temperature applications in the presence of aqueous media or water vapor. Specifically, there is a need to develop polymer vulcanizates with improved physical properties such as hot air aging having a swelling resistance to polar media such as water and aqueous systems.

It is an object of the present invention to obviate or mitigate at least one of the above-mentioned disadvantages of the prior art.

It is another object of the present invention to provide a novel polymer vulcanizate.

It is yet another object of the present invention to provide a novel process for producing said novel polymer vulcanizate.

It is yet another object of the present invention to provide a novel polymer composition for producing a polymer vulcanizate.

It is yet another object of the present invention to provide a novel method for improving the hot air aging characteristics of a polymer vulcanizate and at the same time improving the swelling resistance to polar media.

SUMMARY OF THE INVENTION

Accordingly, in one of its aspects, the present invention provides a polymer composition comprising:
(i) a polymer having a main polymer chain derived from
   (ia) at least 30% by weight to 100% by weight based on the polymer of a first monomer which introduces at least one of a secondary carbon and a tertiary carbon to the main polymer chain, and
   (ib) in the range of from 0 to 70% by weight based on the polymer of at least one other monomer;
(ii) at least one lithium salt; and
(iii) at least one antioxidant.

DETAILED DESCRIPTION OF THE INVENTION

A particularly preferred polymer composition comprises:
(i) a hydrogenated nitrile polymer;
(ii) at least one lithium salt;
(iii) at least one antioxidant;
(iv) at least one filler;
(v) a vulcanization system; and
(vi) optionally at least one carbodiimide, at least one polycarbodiimide or mixtures thereof.

In another of its aspects, the present invention provides a process for producing a polymer vulcanizate comprising the step of vulcanizing a polymer composition comprising:
(i) a polymer having a main polymer chain derived from
   (ia) at least 30% by weight to 100% by weight based on the polymer of a first monomer which introduces at least one of a secondary carbon and a tertiary carbon to the main polymer chain, and
   (ib) in the range of from 0 to 70% by weight based on the polymer of at least one other monomer;
(ii) at least one lithium salt;
(iii) at least one antioxidant; and
a vulcanization system.

In yet another of its aspects, the present invention provides a vulcanizable composition comprising:
(i) a polymer having a main polymer chain derived from
    (ia) at least 30% by weight to 100% by weight based on the polymer of a first monomer which introduces at least one of a secondary carbon and a tertiary carbon to the main polymer chain, and
    (ib) in the range of from 0 to 70% by weight based on the polymer of at least one other monomer;
(ii) at least one lithium salt;
(iii) at least one antioxidant; and
a vulcanization system.

In yet another of its aspects, the present invention provides a method for improving the hot air aging and aqueous fluid resistance characteristics of a polymer having a main polymer chain derived from
(ia) at least 30% by weight to 100% by weight based on the polymer of a first monomer which introduces at least one of a secondary carbon and a tertiary carbon to the main polymer chain, and
(ib) in the range of from 0 to 70% by weight based on the polymer of at least one other monomer,
comprising the step of admixing said polymer with at least one lithium salt and at least one antioxidant.

In yet another of its aspects, the present invention provides a polymer vulcanizate having a hot air aging time to maintain at least 50% of its original elongation at break of at least about 504 h at 170° C., and having improved swelling characteristics in aqueous media, the vulcanizate derived from a peroxide-based vulcanization system.

Thus, it has been discovered that incorporation of a particular combination of an antioxidant and a lithium salt and optionally a carbodiimide or polycarbodiimide or mixtures thereof in a polymer vulcanizate results in an improvement in the hot air aging characteristics of the vulcanizate (i.e., an improvement in the resistance to oxidative attack in air at elevated temperature aging under oxidizing conditions) as well as—surprisingly and unexpected—at the same time in an improvement of the swelling resistance to aqueous systems, compared to the prior art. In the meaning of the present invention aqueous systems are water, water vapor or mixtures of water with other polar media such as glycols, polyethylene glycols. The vulcanizates of the present invention are especially useful for application in systems which are in contact with aqueous media and at the same time with fuel and/or oil, because of the resistance of the vulcanizates to swelling in aqueous media and the oil/fuel resistance. Such systems are typically used in automotive coolant circuits. The vulcanizates of the present invention are therefore for example useful for application in systems which are in contact with aqueous media at least on one side requiring also fuel and/or oil resistance on another side, for example for fluid circuits in the automotive. The improvement in the hot air aging characteristics and the swelling resistance to aqueous systems of the vulcanizate of the present invention can manifest itself in a number of ways, including (by way of example only) an increase in: (i) the period of time needed for the vulcanizate to maintain at least 50% of its original 100% elongation at break at 170° C.; (ii) the maximum service temperature to which the vulcanizate can be exposed for a specified period of time before dropping below 50% of original elongation at break values, and (iii) drastically limiting the volume and/or mass change after exposure to water and/or aqueous systems, when compared to a vulcanizate made without the additive (in the meaning of the present invention the additive is the combination of an antioxidant and a lithium salt and optionally at least one carbodiimide, at least one polycarbodiimide or mixtures thereof. The present vulcanizates may also be characterized by improvement (i.e., in comparison to a vulcanizate produced without the additive) in one or more of the following properties: aged hot fluid aging, aged compression set, aged dynamic elastic modulus (E'), aged dynamic viscous modulus (E"), aged static modulus, aged low temperature properties and aged hardness.

In one of its aspects, the present invention provides a polymer composition comprising:
(i) a polymer having a main polymer chain derived from
    (ia) at least 30% by weight to 100% by weight based on the polymer of a first monomer which introduces at least one of a secondary carbon and a tertiary carbon to the main polymer chain, and
    (ib) in the range of from 0 to 70% by weight based on the polymer of at least one other monomer;
(ii) at least one lithium salt; and
(iii) at least one antioxidant.

The first component of the present polymer composition is a polymer (i) having a main polymer chain derived from: (ia) at least 30% by weight to 100% by weight based on the polymer of a first monomer which introduces at least one of a secondary carbon and a tertiary carbon to the main polymer chain, and (ib) in the range of from 0 to 70% by weight based on the polymer of at least one other monomer.

As used throughout this specification, the term "polymer" is intended to have a broad meaning and is meant to encompass any polymer having a main polymer chain which comprises at least one secondary or tertiary carbon. Those of skill in the art will understand that a secondary carbon is a carbon atom having two hydrogen atoms bonded to it while a tertiary carbon is a carbon atom having one hydrogen atom bonded to it. The polymer may be a homopolymer, a copolymer, a terpolymer and the like. Also, it is possible to use a mixture of polymers provided at least one polymer in the mixture has the polymer main chain properties described above.

The polymer suitable for use herein may be an elastomer (e.g., a hydrocarbon rubber), a graft polymer or block polymer of monomers having at least one ethylenically unsaturated bond and polymerizable through this unsaturation, and the like.

Elastomers are well known to those of skill in the art. Non-limiting examples of suitable elastomers may be selected from the group consisting of natural rubber (NR), cis-1,4-polyisoprene rubber (IR), polybutadiene rubber (BR), styrene-butadiene rubber (SBR), nitrile rubber like acrylonitrile-butadiene rubber (NBR), hydrogenated acrylonitrile-butadiene rubber (HNBR), other HNBR copolymers, HNBR terpolymers (including hydrogenated acrylonitrile, butadiene, unsaturated carboxylic acid ester terpolymers), ethylene-propylene monomer rubber (EPM), ethylene-propylene-diene monomer rubber (FPDM), ethylene-vinyl acetate rubber (EVM) and the like, Of course, subject to compatibility, mixtures of two or more of any of the foregoing polymers may be used herein.

Preferably, the polymer used in the present polymer composition is an elastomer. More preferably, the elastomer is selected from the group consisting of: a nitrile polymer, ethylene-propylene copolymer, ethylene-propylene-non conjugated diene terpolymer, ethylene-vinyl acetate copolymer, for example EVM with the trade names Levapren® and Levamelt® of Lanxess Deutschland GmbH, styrene, conjugated diene copolymer, hydrogenated styrene/conjugated diene copolymer, polyisoprene, natural rubber, polybutadiene and mixtures thereof.

As used throughout this specification, the term "nitrile polymer" is intended to have a broad meaning and is meant to encompass a copolymer of a conjugated diene and an unsaturated nitrile.

The conjugated diene may be a $C_4$-$C_6$ conjugated diene. Non-limiting examples of suitable such conjugated dienes may be selected from the group comprising butadiene, iso-prene, piperylene, 2,3-dimethyl butadiene and mixtures thereof. The preferred $C_4$-$C_6$ conjugated diene may be selected from the group comprising butadiene, iso-prene and mixtures thereof. The most preferred $C_4$-$C_6$ conjugated diene is butadiene.

The unsaturated nitrile may be a $C_3$-$C_5$ α,β-unsaturated nitrile. Non-limiting examples of suitable such $C_3$-$C_5$ α,β-unsaturated nitrites may be selected from the group comprising acrylonitrile, methacrylonitrile, ethacyrlonitrile and mixtures thereof. The most preferred $C_3$-$C_5$ α,β-unsaturated nitrile is acrylonitrile.

Preferably, the nitrile polymer is selected from the group consisting of hydrogenated nitrile/conjugated diene copolymer, nitrile/conjugated diene copolymer, nitrile/conjugated diene/ethylenically unsaturated monomer terpolymer and hydrogenated nitrile/conjugated diene/ethylenically unsaturated monomer terpolymer. More preferably, the nitrile polymer is a hydrogenated nitrile/conjugated diene copolymer.

Preferably, the copolymer comprises from about 40 to about 85 weight percent of the copolymer of bound conjugated diene and from about 15 to about 60 weight percent of the copolymer of bound unsaturated nitrile. More preferably, the copolymer comprises from about 60 to about 75 weight percent of the copolymer of bound conjugated diene and from about 25 to about 40 weight percent of the copolymer of bound unsaturated nitrile. Most preferably, the copolymer comprises from about 60 to about 70 weight percent of the copolymer of bound conjugated diene and from about 30 to about 40 weight percent of the copolymer of bound unsaturated nitrile.

Optionally, the copolymer may further comprise a bound unsaturated carboxylic acid. Non-limiting examples of suitable such bound unsaturated carboxylic acids may be selected from the group comprising fumaric acid, maleic acid, acrylic acid, methacrylic acid and mixtures thereof. The bound unsaturated carboxylic acid may be present in an amount of from about 1 to about 10 weight percent of the copolymer, with this amount displacing a corresponding amount of the conjugated diolefin.

Further, a third monomer may be used in production of the nitrile polymer. Preferably, the third monomer is an unsaturated mono- or di-carboxylic acid or derivative thereof (e.g., esters, amides and the like). While the invention may be used with fully or partially unsaturated nitrite polymers, a particularly preferred group of nitrile polymers useful in the production of the present vulcanizate are hydrogenated or partially hydrogenated nitrile polymers (also known in the art as HNBR). Preferably, the copolymer is hydrogenated (hydrogenated nitrile/conjugated diene copolymer) and comprises a residual carbon-carbon double bond unsaturation of less than about 30, more preferably from about 30 to about 0.05 mole percent, even more preferably from about 15 to about 0.05 mole percent, even more preferably from about 10.0 to about 0.05 mole percent, even more preferably from about 7.0 to about 0.05 mole percent, most preferably from about 5.5 to about 0.05 mole percent.

The polymers, preferably these elastomers, are well known in the art and are readily available to or may be produced by a person of skill in the art.

The second component of the present polymer composition is at least one lithium salt (ii), preferably a lithium salt of a weak acid, preferably having a $pk_a$ of at least about 9.0, more preferably of at least about 10.0, most preferably in the range of from about 10.0 to about 14.0.

Non-limiting examples of weak acids useful in the production of the above-mentioned lithium salt may be selected from the group consisting of carbonic acid, $C_1$-$C_{50}$ fatty acids, ethylene diamine tetra(acetic acid), phosphoric acid and mixtures thereof. Preferably, the weak acid is selected from carbonic acid and $C_1$-$C_{30}$ fatty acids. The most preferred salt for use in the present polymer composition is lithium carbonate.

Preferably, the lithium salt is present in the polymer composition in an amount in the range of from 0.5 to 30 parts by weight, preferably in the range of from 1 to 20 parts by weight, most preferably in the range of from 2.5 to 9 parts by weight.

The third component of the present polymer composition is at least one antioxidant. Suitable antioxidants are known by a person skilled in the art. Preferred antioxidants are selected from the group consisting of aminic antioxidants, preferably monofunctional or oligofunctional secondary aromatic amines or sterically hindered amines, and phenolic antioxidants preferably monofunctional or oligofunctional substituted phenols. More preferably, the antioxidant is selected from alkylated and/or arylated diphenylamines and sterically hindered amines. Most preferably, the antioxidant is selected from the group consisting of 4,4'-bis-(1,1-dimethylbenzyl)-diphenylamine (CDPA), styrenated diphenylamine (SDPA; 4,4'-bis-(phenylethyl)-diphenylamine), 4,4'-bis(octyl)-diphenylamine (OCD) and 2,2,4-trimethyl-1,2-dihydro-quinoline, polymerized (TMQ).

Preferably, the antioxidant is present in the polymer composition in an amount of from about 0.5 to about 4 parts by weight per hundred parts by weight of the polymer.

It has been found by the inventors of the present invention that polymer vulcanizates having improved hot air aging characteristics combined with an improved swelling resistance to aqueous media are obtained by the usage of a combination of a lithium salt and an antioxidant in the polymer compositions of the present invention, especially in the vulcanizable polymer compositions of the present invention. A particularly preferred combination of a lithium salt and an antioxidant is the combination of lithium carbonate and CDPA, SDPA, OCD or TMQ.

Most preferably, the polymer composition of the present invention comprises as a polymer a hydrogenated nitrile/conjugated diene copolymer, as lithium salt lithium carbonate and as antioxidant CDPA, SDPA, OCD or TMQ.

Optionally, the present polymer composition further comprises at least one carbodiimide, at least one polycarbodiimide or mixtures thereof. The preferred carbodimide is available commercially under the tradenames Rhenogram® P50 and Stabaxol® P. This ingredient may be used in the present polymer composition in an amount in the range of from 0 to 15 parts by weight, more preferably in the range of from 0 to 10 parts by weight, even more preferably in the range of from 0 to 2 parts by weight.

The polymer composition according to this invention preferably further comprises a filler (iv). The nature of the filler is not particularly restricted and the choice of suitable fillers is within the purview of a person skilled in the art. Non-limiting examples of suitable fillers include carbon black (e.g., FEF, MT, GPF and SRF), clays, titanium dioxide, silica fillers (with or without unsaturated silanes) and the like. The amount of filler is conventional. Preferably, the filler is present in an amount in the range of from about 20 to about 130 parts by weight per hundred parts by weight of the polymer. More preferably, the filler is present in an amount in the range of from about 20 to about 100 parts by weight per hundred parts by weight of the polymer. Most preferably, the filler is present in an amount in the range of from about 40 to about 80 parts by weight per hundred parts by weight of the polymer.

Preferably, the present polymer composition further comprises a vulcanization system (iii). The suitable vulcanization system is conventional and the choice thereof is within the purview of a person skilled in the art.

In one embodiment, the vulcanization system used in the present invention comprises an organic peroxide (e.g., dicumyl peroxide, 2,2'-bis(tert-butylperoxy diisopropyl-benzene and the like). In another embodiment, the vulcanization system used in the present invention comprises sulfur or a conventional sulfur-containing vulcanization product such as Vulkacit® DM/C (benzothiazyl disulfide), Vulkacit® Thiuram MS/C (tetramethyl thiuram monosulfide), Vulkacit® Thiuram/C (tetramethyl thiuram disulfide), mixtures thereof and the like. Preferably, such sulfur-based vulcanization systems further comprise a peroxide such as zinc peroxide.

In yet another embodiment, the vulcanization system used in the present invention comprises a reactive phenol-formaldehyde resin and a Lewis acid activator. It is known to those skilled in the art that a reactive phenol-formaldehyde resins may be prepared by reacting a para-substituted phenol with a molar excess of formaldehyde—see, for example, U.S. Pat. No. 2,726,224, the contents of which are hereby incorporated by reference. The use of such phenolformaldehyde resins in vulcanization systems for butyl rubber is well known.

The vulcanization system used in the process according to this invention preferably contains at least about 3 parts by weight reactive phenol-formaldehyde resin per hundred parts by weight nitrile polymer. It is especially preferred to use from about 8 to about 16 parts by weight of the reactive phenol-formaldehyde resin per hundred parts by weight polymer. If more than about 16 parts by weight of the resin per hundred parts of nitrile polymer are employed, the entire composition tends to become resinous, and hence such high levels of resin are generally undesirable.

The Lewis acid activator may be present as a separate component such as stannous chloride ($SnCl_2$) or poly(chlorobutadiene). Alternatively, the Lewis acid activator may be present within the structure of the resin itself—for example, bromomethylated alkyl phenol-formaldehyde resin (which may be prepared by replacing some of the hydroxyl groups of the methylol group of the resin discussed above with bromine). The use of such halogenated resins in vulcanization systems for butyl rubber is well known to those skilled in the art.

The present invention further relates to a process for producing a polymer vulcanizate comprising the step of vulcanizing the polymer composition of the present invention comprising a vulcanization system. Suitable polymer compositions and vulcanization system are mentioned before.

A particular preferred polymer composition comprises:
(i) a hydrogenated nitrile polymer;
(ii) at least one lithium salt;
(iii) at least one antioxidant;
(iv) at least one filler;
(v) a vulcanization system; and
(vi) optionally at least one carbodiimide, at least one polycarbodiimide or mixtures thereof.

In the present process, the polymer, the lithium salt, the antioxidant, optionally further components as mentioned before and the vulcanization system may be admixed in any conventional manner known to the art. For example, this polymer composition may be admixed on a two-roll rubber mill or an internal mixer. The preferred hydrogenated nitrile copolymer used in the present process tends to be quite stiff, and is prone to bag when mixed on a two-roll rubber mill. The addition of a reactive phenol-formaldehyde resin improves the mixing of the hydrogenated copolymer by reducing the bagging problem.

Thus, the polymer composition is mixed in a conventional manner and the temperature thereof during mixing is maintained as is known in the art.

In a preferred embodiment of the process for preparing the polymer composition according to the present invention a masterbatch is prepared in the first step by mixing a polymer (i), at least one lithium salt (ii) and optionally other compounding ingredients, preferably at least one filler like e.g. carbon black (e.g., FEF, MT, GPF and SRF), clays, titanium dioxide, or silica (with or without unsaturated silanes), in particular silica. Based on the total weight of the masterbatch, such masterbatch typically comprises 30-70% b.w., preferably 40 to 60% b.w., of the polymer (i) and 70-30% b.w., preferably 60-40% b.w. of at least one lithium salt (ii). Based on the total weight of the masterbatch, optionally up to 10% b.w. of other compounding ingredients like in particular silica can be used to prepare the masterbatch, with this amount displacing a corresponding amount of the polymer (i). A masterbatch according to the preceding description is e.g. commercially available from Rheinchemie Rheinau GmbH as Rhenogram® $Li_2CO_3$-50. The inventive polymer composition is then prepared by mixing such masterbatch with further amounts of polymer (i), at least one antioxidant (iii) optionally further amounts of a filler (iv), and optionally at least one carbodimide, at least one polycarbodiimide or mixtures thereof. The polymer (i) used to prepare the masterbatch may be identical or different to the polymer (i) subsequently mixed with the masterbatch to form the inventive polymer composition. Using such masterbatch for preparing the polymer composition according to the present invention allows a very homogeneous, spot-free and therefore advantageous distribution of the lithium salt in the polymer composition.

In the present process according to this invention, it is preferred to heat the polymer composition to form vulcanizates using conventional procedures well known in the art. Preferably, the polymer composition is heated to a temperature in the range of from about 130° to about 200° C., preferably from about 140° to about 190° C., more preferably from about 150° to about 180° C. Preferably, the heating is conducted for a period of from about 1 minutes to about 15 hours, more preferably from about 5 minutes to about 30 minutes.

Other conventional compounding ingredients may also be included by mixing with the copolymer in the conventional manner. Such other compounding ingredients are used for their conventional purposes and include activators such as zinc oxide and magnesium oxide; plasticizers; processing aids; reinforcing agents; fillers; promoters and retarders in amounts well known in the art.

In a further embodiment the present invention relates to a polymer vulcanizate produced by the process mentioned before. Preferably, the polymer vulcanizate has a hot air aging time to maintain at least 50% of its original elongation at break of at least about 504 h at 170° C., and having improved swelling characteristics in aqueous media, the vulcanizate derived from a peroxide-based vulcanization system. The aqueous media has been defined before. Preferably, the aqueous media is selected from the group consisting of water and water/glycol mixtures. In the meaning of the present invention glycol also relates to polycondensates of glycols.

Further, the present invention relates to a polymer vulcanizate having a hot air aging time to maintain at least 50% of its original elongation at break of at least about 504 h at 170° C., and having improved swelling characteristics in aqueous media, the vulcanizate derived from a peroxide-based vulcanization system.

In a further embodiment the present invention relates to a method for improving the hot air aging and aqueous fluid resistance characteristics of a polymer having a main polymer chain derived from
(ia) at least 30% by weight to 100% by weight based on the polymer of a first monomer which introduces at least one of a secondary carbon and a tertiary carbon to the main polymer chain, aid
(ib) in the range of from 0 to 70% by weight based on the polymer of at least one other monomer,
comprising the step of admixing said polymer with at least one lithium salt and at least one antioxidant.

Suitable and preferred polymers, lithium salts, antioxidants and suitable and preferred amounts of said components are mentioned before.

In further embodiments the method further comprises admixing at least one carbodiimide, at least one polycarbodiimide or mixtures thereof with the polymer, the lithium salt and the antioxidant and/or admixing at least one filler with the polymer, the lithium salt and the antioxidant and/or admixing a vulcanization system with the polymer, the lithium salt and the antioxidant.

FIGURES

FIG. 1 shows the change in tensile strength (left column of each double columns) and elongation at break (right column of each double columns) after 24 hours at 100° C. of formulations of the HNBR vulcanizates Q 01 to Q 10 described in Table 1 of the subsequent Examples. The most left double columns represent Example Q 01 and the most right double columns represent Example Q 10. The double columns inbetween represent Examples Q 02 to Q 09 from left to right.

Embodiments of the present invention will be illustrated with reference to the following Examples which are provided for illustrative purposes and should not be used to limit the scope of the invention. Unless otherwise stated, all parts in the Examples are parts by weight.

EXAMPLES

In the subsequent Examples, the materials used include the following:
Therban® A 3407: a hydrogenated nitrile butadiene polymer commercially available from Lanxess Deutschland GmbH;
Corax® N 550/30: carbon black, FEF (fast extrusion furnace) commercially available from Evonik-Degussa AG;
Zinkoxyd Aktiv®: activator; fine particles of precipitated zinc oxide commercially available from Lanxess Deutschland GmbH;
Maglite® DE: magnesium oxide, activator, commercially available from CP Hall;
Luvomaxx® CDPA: commercially available from Lehmann & Voss;
Dynamar® RC-5251 Q: sodium carbonate commercially available from Dyneon;
Edenor® C18 98-100: surfactant commercially available from Cognis GmbH
TAIC (Kettlitz-TAIC): preparations of triallylisocyanurate (TAIC) on extremely fine silica as carrier in powder form commercially available from Kettlitz-Chemie GmbH & Co. KG
Perkadox® BC-40 B-PD: Di(tert.-butylperoxyisopropyl)-benzene, granulated commercially available from Akzo Nobel AG Examples 1-10

The following procedure was used for each of Examples 10. The polymer composition used in Examples Q01-10 are shown in Table 1. As will be apparent to those of skill in the art, the polymer composition of Example Q01 and Q02 contain no special additive or lithium carbonate alone. Examples Q07-10 contain sodium carbonate, antioxidant and optionally carbodiimide or polycarbodiimides. Accordingly, these examples are provided for comparison purposes only and are outside the scope of the present invention.

The components of the polymer composition were mixed in a Banbury mixer using conventional techniques. The polymer composition was vulcanized at 180° C. for a period of 20 minutes.

The tensile stress at rupture ("tensile strength") of the vulcanizates was determined in accordance with ASTM D412-80. Hot air aging properties of the vulcanizates were determined in accordance with ASTM-D573-88. Hardness properties were determined using a Type A Shore durometer in accordance with ASTM-D2240-81. The properties of the vulcanizates are reported in Table 2. The hot air aging properties of the vulcanizates are also illustrated in the Table 3 to 6.

The properties of the HNBR vulcanizates reported in Table 1 to 7 and illustrated in FIG. 1 clearly illustrate the superiority of the hot air aging and significantly improved aqueous media swelling characteristics of the vulcanizates of Examples 3 to 6 (special additive used) when compared to the vulcanizate of Example 1 and 2 (conventional MgO additive or lithium carbonate only used). Table 7, as well as FIG. 1 is particularly instructive in showing the significant improvement in the swelling resistance of the combinations of lithium carbonate with antioxidant and optionally carbodiimide or polycarbodiimide, respectively versus the sodium carbonate based combinations (reference) under the test conditions. This translates into a significant practical advantages in many of the conventional applications of the vulcanizates.

TABLE 1

Formulation of the HNBR Vulcanisates

|  | Ref | | Li-Carbonate | | | | Na-Carbonate | | | |
| --- | --- | --- | --- | --- | --- | --- | --- | --- | --- | --- |
| Sample ID | Q01 | Q02 | Q03 | Q04 | Q05 | Q06 | Q07 | Q08 | Q09 | Q10 |
| THERBAN ® A 3407 | 100 | 100 | 100 | 100 | 100 | 100 | 100 | 100 | 100 | 100 |
| CORAX ® N 550/30 | 45 | 45 | 45 | 45 | 45 | 45 | 45 | 45 | 45 | 45 |
| ZINKOXYD AKTIV | 2 | 2 | 2 | 2 | 2 | 2 | 2 | 2 | 2 | 2 |

TABLE 1-continued

Formulation of the HNBR Vulcanisates

| | Ref | | Li-Carbonate | | | | Na-Carbonate | | | |
|---|---|---|---|---|---|---|---|---|---|---|
| Sample ID | Q01 | Q02 | Q03 | Q04 | Q05 | Q06 | Q07 | Q08 | Q09 | Q10 |
| MAGLITE ® DE | 3 | 3 | 3 | 3 | 3 | 3 | 3 | 3 | 3 | 3 |
| LUVOMAXX ® CDPA | 1.1 | | 1.1 | 1.1 | 1.1 | 1.1 | 1.1 | 1.1 | 1.1 | 1.1 |
| LITHIUM CARBONATE | | 3 | 1.5 | 3 | 3 | 6 | | | | |
| DYNAMAR ® RC-5251 Q | | | | | | | 1.5 | 3 | 3 | 6 |
| STABILISATOR ® 9000 | | | | | 3 | | | | 3 | |
| EDENOR ® C 18 98-100 | 0.5 | 0.5 | 0.5 | 0.5 | 0.5 | 0.5 | 0.5 | 0.5 | 0.5 | 0.5 |
| TAIC (KETTLITZ-TAIC) | 1.5 | 1.5 | 1.5 | 1.5 | 1.5 | 1.5 | 1.5 | 1.5 | 1.5 | 1.5 |
| PERKADOX ® BC-40 B-PD | 7 | 7 | 7 | 7 | 7 | 7 | 7 | 7 | 7 | 7 |

TABLE 2

Physical Properties of the Unaged HNBR-Vulcanisates
Specimen: norm rod S2
stress-strain rod S2 RT
unaged: 0 h
Temperature 23° C.

| sample name | | Q01 | Q02 | Q03 | Q04 | Q05 | Q06 | Q07 | Q08 | Q09 | Q10 |
|---|---|---|---|---|---|---|---|---|---|---|---|
| T.S. Median | MPa | 25.7 | 25.5 | 25.1 | 24.3 | 23.2 | 24.3 | 24.5 | 24.5 | 23.3 | 24.1 |
| E.B. Median | % | 400 | 331 | 399 | 397 | 394 | 391 | 379 | 386 | 385 | 379 |
| Hardness ShA | Shore A | 65 | 68 | 66 | 65 | 65 | 64 | 60 | 54 | 58 | 46 |
| S10 | MPa | 0.7 | 0.7 | 0.7 | 0.7 | 0.7 | 0.7 | 0.7 | 0.7 | 0.7 | 0.7 |
| S25 | MPa | 1.1 | 1.2 | 1.1 | 1.1 | 1.2 | 1.1 | 1.1 | 1.1 | 1.2 | 1.1 |
| S50 | MPa | 1.6 | 1.8 | 1.6 | 1.6 | 1.7 | 1.6 | 1.6 | 1.7 | 1.7 | 1.7 |
| S100 | MPa | 3.5 | 4.3 | 3.3 | 3.3 | 3.3 | 3.4 | 3.6 | 3.7 | 3.5 | 3.5 |
| S300 | MPa | 20.1 | 23.2 | 19.5 | 19 | 18.3 | 19.3 | 20.1 | 19.8 | 18.5 | 19.8 |

TABLE 3

HNBR Vulcanizate Properties after 168 h @170° C.
Specimen: norm rod S2
stress-strain rod S2 RT
storage time 168 h at 170° C.
Temperature 23° C.

| | | Q01 | Q02 | Q03 | Q04 | Q05 | Q06 | Q07 | Q08 | Q09 | Q10 |
|---|---|---|---|---|---|---|---|---|---|---|---|
| TS Median | MPa | 19.7 | 18.9 | 17.9 | 17 | 21.1 | 15.9 | 11.7 | 9.7 | 12.9 | 8.6 |
| EB Median | % | 356 | 291 | 371 | 395 | 351 | 369 | 510 | 532 | 537 | 507 |
| Hardness ShA | Shore A | 77 | 79 | 77 | 78 | 76 | 78 | 78 | 77 | 75 | 77 |
| S10 | MPa | 1.1 | 1.3 | 1.2 | 1.2 | 1.1 | 1.2 | 1.2 | 1.2 | 1.1 | 1.2 |
| S25 | MPa | 2.1 | 2.4 | 2.1 | 2.1 | 1.9 | 2.2 | 2.1 | 2.1 | 1.8 | 2.1 |
| S50 | MPa | 3.6 | 4.3 | 3.6 | 3.6 | 3.2 | 3.8 | 3.3 | 3.2 | 2.7 | 3.2 |
| S100 | MPa | 7.8 | 9 | 7.6 | 7.2 | 6.7 | 7.3 | 5.8 | 5.2 | 4.7 | 4.9 |
| S300 | MPa | 18.8 | — | 16.9 | 15.9 | 19.8 | 15.3 | 10.4 | 8.4 | 10.1 | 7.6 |
| S10-Change | % | 57.1 | 85.7 | 71.4 | 71.4 | 57.1 | 71.4 | 71.4 | 71.4 | 57.1 | 71.4 |
| S25-Change | % | 90.9 | 100.0 | 90.9 | 90.9 | 58.3 | 100.0 | 90.9 | 90.9 | 50.0 | 90.9 |
| S50-Change | % | 125.0 | 138.9 | 125.0 | 125.0 | 88.2 | 137.5 | 106.3 | 88.2 | 58.8 | 88.2 |
| S100-Change | % | 122.9 | 109.3 | 130.3 | 118.2 | 103.0 | 114.7 | 61.1 | 40.5 | 34.3 | 40.0 |
| S300-Change | % | −6.5 | — | −13.3 | −16.3 | 8.2 | −20.7 | −48.3 | −57.6 | −45.4 | −61.6 |
| TS Change | % | −23.3 | −25.9 | −28.7 | −30 | −9.1 | −34.6 | −52.2 | −60.4 | −44.6 | −64.3 |
| EB Change | % | −11 | −12 | −7 | −1 | −11 | −6 | 35 | 38 | 39 | 34 |
| Hardness Change ShA | Shore A | 11 | 11 | 12 | 11 | 9 | 12 | 12 | 11 | 8 | 11 |

TABLE 4

HNBR Vulcanizate Properties after 336 h @170° C.
Specimen: norm rod S2
stress-strain rod S2 RT
storage time 336 h @ 170° C.
stress-strain rod S2 RT 23° C.

| | | Q01 | Q02 | Q03 | Q04 | Q05 | Q06 | Q07 | Q08 | Q09 | Q10 |
|---|---|---|---|---|---|---|---|---|---|---|---|
| TS Median | MPa | 19.7 | 18 | 17.2 | 16.1 | 18.6 | 14.6 | 10.2 | 7.8 | 9.1 | 6.8 |
| EB Median | % | 287 | 164 | 320 | 341 | 315 | 322 | 358 | 372 | 446 | 359 |

TABLE 4-continued

HNBR Vulcanizate Properties after 336 h @170° C.
Specimen: norm rod S2
stress-strain rod S2 RT
storage time 336 h @ 170° C.
stress-strain rod S2 RT 23° C.

| | | Q01 | Q02 | Q03 | Q04 | Q05 | Q06 | Q07 | Q08 | Q09 | Q10 |
|---|---|---|---|---|---|---|---|---|---|---|---|
| Hardness ShA | Shore A | 79 | 84 | 80 | 80 | 79 | 80 | 80 | 79 | 79 | 80 |
| S10 | MPa | 1.4 | 1.7 | 1.3 | 1.4 | 1.3 | 1.4 | 1.3 | 1.4 | 1.3 | 1.4 |
| S25 | MPa | 2.6 | 3.5 | 2.6 | 2.6 | 2.5 | 2.6 | 2.5 | 2.5 | 2.3 | 2.5 |
| S50 | MPa | 4.8 | 6.7 | 4.6 | 4.5 | 4.4 | 4.7 | 4.1 | 4 | 3.6 | 3.8 |
| S100 | MPa | 10.2 | 13.1 | 9.5 | 8.9 | 8.9 | 8.7 | 7.3 | 6.3 | 6 | 5.7 |
| S300 | MPa | 19.7 | — | 17 | 15.9 | 18.5 | 14.5 | 10.1 | 7.6 | 8.9 | 6.6 |
| S10-Change | % | 100.0 | 142.9 | 85.7 | 100.0 | 85.7 | 100.0 | 85.7 | 100.0 | 85.7 | 100.0 |
| S25-Change | % | 136.4 | 191.7 | 136.4 | 136.4 | 108.3 | 136.4 | 127.3 | 127.3 | 91.7 | 127.3 |
| S50-Change | % | 200.0 | 272.2 | 187.5 | 181.3 | 158.8 | 193.8 | 156.3 | 135.3 | 111.8 | 123.5 |
| S100-Change | % | 191.4 | 204.7 | 187.9 | 169.7 | 169.7 | 155.9 | 102.8 | 70.3 | 71.4 | 62.9 |
| S300-Change | % | −2 | — | −12.8 | −16.3 | 1.1 | −24.9 | −49.8 | −61.6 | −51.9 | −66.7 |
| TS Change | % | −23.3 | −29.4 | −31.5 | −33.7 | −19.8 | −39.9 | −58.4 | −68.2 | −60.9 | −71.8 |
| EB Change | % | −28 | −50 | −20 | −14 | −20 | −18 | −6 | −4 | 16 | −5 |
| Hardness Change ShA | Shore A | 14 | 16 | 14 | 14 | 12 | 13 | 14 | 13 | 12 | 14 |

TABLE 5

HBNR Vulcanizate Properties after 504 h @170° C.
Specimen: norm rod S2
stress-strain rod S2 RT
storage time: 504 h @ 170° C.
Temperature 23° C.

| | | Q01 | Q02 | Q03 | Q04 | Q05 | Q06 | Q07 | Q08 | Q09 | Q10 |
|---|---|---|---|---|---|---|---|---|---|---|---|
| TS Median | MPa | 21.4 | 13.5 | 19.3 | 18.1 | 19.6 | 16.4 | 12.2 | 9.5 | 10.1 | 8 |
| EB Median | % | 166 | 50 | 205 | 229 | 224 | 227 | 228 | 183 | 258 | 159 |
| Hardness ShA | Shore A | 84 | 89 | 83 | 83 | 83 | 83 | 82 | 82 | 82 | 84 |
| S10 | MPa | 1.8 | 3 | 1.6 | 1.5 | 1.6 | 1.6 | 1.4 | 1.5 | 1.4 | 1.7 |
| S25 | MPa | 3.6 | 7 | 3.3 | 3.1 | 3.2 | 3.2 | 2.8 | 3 | 2.7 | 3.3 |
| S50 | MPa | 7.2 | 13.1 | 6.3 | 5.9 | 6 | 5.9 | 5 | 5.3 | 4.7 | 5.3 |
| S100 | MPa | 14.8 | — | 12.7 | 11.5 | 12 | 11 | 9.1 | 8.4 | 7.8 | 7.6 |
| S300 | MPa | — | — | — | — | — | — | — | — | — | — |
| S10-Change | % | 157.1 | 328.6 | 128.6 | 114.3 | 128.6 | 128.6 | 100.0 | 114.3 | 100.0 | 142.9 |
| S25-Change | % | 227.3 | 483.3 | 200.0 | 181.8 | 166.7 | 190.9 | 154.5 | 172.7 | 125.0 | 200.0 |
| S50-Change | % | 350.0 | 627.8 | 293.8 | 268.8 | 252.9 | 268.8 | 212.5 | 211.8 | 176.5 | 211.8 |
| S100-Change | % | 322.9 | — | 284.8 | 248.5 | 263.6 | 223.5 | 152.8 | 127.0 | 122.9 | 117.1 |
| S300-Change | % | — | — | — | — | — | — | — | — | — | — |
| TS Change | % | −16.7 | −47.1 | −23.1 | −25.5 | −15.5 | −32.5 | −50.2 | −61.2 | −56.7 | −66.8 |
| EB Change | % | −59 | −85 | −49 | −42 | −43 | −42 | −40 | −53 | −33 | −58 |
| Hardness Change ShA | Shore A | 19 | 21 | 17 | 17 | 16 | 16 | 16 | 16 | 15 | 17 |

TABLE 6

Compression Set @160° C. in Hot Air of HNBR Vulcanisates
Specimen: C.S. (DIN A d = 13 mm × 6.3 mm) from slab

| Compression Set A | | | Q01 | Q02 | Q03 | Q04 | Q05 | Q06 | Q07 | Q08 | Q09 | Q10 |
|---|---|---|---|---|---|---|---|---|---|---|---|---|
| test method | DIN ISO | | | | | | | | | | | |
| Time | H | 168 | | | | | | | | | | |
| storage temperature | ° C. | 160 | | | | | | | | | | |
| deformation (Ist) | % | 25 | | | | | | | | | | |
| test temperature | ° C. | 23 | | | | | | | | | | |
| C.S. | % | | 56 | 46 | 57 | 51 | 58 | 54 | 49 | 51 | 56 | 47 |
| Time | H | 336 | | | | | | | | | | |
| C.S. | % | | 63 | 54 | 60 | 62 | 63 | 59 | 55 | 55 | 67 | 53 |
| Time | H | 504 | | | | | | | | | | |
| C.S. | % | | 67 | 62 | 66 | 68 | 71 | 64 | 58 | 59 | 68 | 59 |
| Time | H | 1008 | | | | | | | | | | |
| C.S. | % | | 76 | 73 | 71 | 71 | 75 | 71 | 68 | 66 | 75 | 66 |

TABLE 7

HBNR Vulcanizate Properties after 24 h @100° C. in Water
Specimen: norm rod S2
stress-strain rod S2 RT
storage time 24 h immersion in water @ 100° C.
Temperature 23° C.

|  |  | Q01 | Q02 | Q03 | Q04 | Q05 | Q06 | Q07 | Q08 | Q09 | Q10 |
|---|---|---|---|---|---|---|---|---|---|---|---|
| T.S. Median | MPa | 27.5 | 27.3 | 26.5 | 26.5 | 25 | 24.7 | 23.1 | 20.2 | 21.3 | 17.2 |
| E.B. Median | % | 404 | 342 | 400 | 396 | 389 | 380 | 311 | 262 | 285 | 203 |
| S10 | MPa | 0.7 | 0.8 | 0.7 | 0.7 | 0.7 | 0.7 | 0.6 | 0.6 | 0.7 | 0.7 |
| S25 | MPa | 1.2 | 1.3 | 1.2 | 1.2 | 1.2 | 1.2 | 1.1 | 1.1 | 1.2 | 1.3 |
| S50 | MPa | 1.7 | 2 | 1.7 | 1.7 | 1.7 | 1.7 | 1.7 | 1.8 | 1.9 | 2.3 |
| S100 | MPa | 3.7 | 5 | 3.8 | 3.6 | 3.4 | 3.7 | 4 | 4.6 | 4.4 | 5.9 |
| S300 | MPa | 21 | 24.6 | 20.9 | 20.4 | 19 | 20.3 | 22.3 | — | — | — |
| Hardness ShA | Shore A | 65 | 68 | 66 | 65 | 65 | 64 | 60 | 54 | 58 | 46 |
| S10-Change | % | 0 | 14.3 | 0 | 0 | 0 | 0 | −14.3 | −14.3 | 0 | 0 |
| S25-Change | % | 9.1 | 8.3 | 9.1 | 9.1 | 0 | 9.1 | 0 | 0 | 0 | 18.2 |
| S50-Change | % | 6.3 | 11.1 | 6.3 | 6.3 | 0 | 6.3 | 6.3 | 5.9 | 11.8 | 35.3 |
| S100-Change | % | 5.7 | 16.3 | 15.2 | 9.1 | 3 | 8.8 | 11.1 | 24.3 | 25.7 | 68.6 |
| S300-Change | % | 4.5 | 6 | 7.2 | 7.4 | 3.8 | 5.2 | 10.9 | — | — | — |
| TS Change | % | 7 | 7.1 | 5.6 | 9.1 | 7.8 | 1.6 | −5.7 | −17.6 | −8.6 | −28.6 |
| EB Change | % | 1 | 3 | 0 | 0 | −1 | −3 | −18 | −32 | −26 | −46 |
| Hardness change ShA | Shore A | −0.63 | 0 | 0.03 | −0.73 | −1.4 | −2.33 | −5.67 | −12.1 | −9.34 | −20.7 |
| weight change | % | 1.29 | 2.94 | 2.6 | 3.27 | 3.35 | 3.3 | 15.72 | 26.04 | 25.48 | 48.02 |
| Volume change | % | 0.97 | 2.73 | 2.56 | 3.22 | 3.39 | 3.33 | 17.44 | 29.28 | 28.59 | 54.99 |

What is claimed is:

1. A polymer composition comprising:
   (i) a nitrile polymer wherein the nitrile polymer is selected from the group consisting of hydrogenated nitrile/conjugated diene copolymer, nitrile/conjugated diene/ethylenically unsaturated monomer terpolymer, hydrogenated nitrile/conjugated diene/ethylenically unsaturated monomer terpolymer, and mixtures thereof,
   (ii) lithium carbonate; and
   (iii) at least one antioxidant selected from the group consisting of 4,4'-bis-(1,1-dimethylbenzyl)-diphenylamine, 4,4'-bis(phenylethyl)-diphenylamine, 4,4'-bis(octyl(-diphenylamine) and 2.2.4-trimethyl-1,2-dihydroquinoline, polymerized.

2. The polymer composition according to claim 1, wherein the hydrogenated nitrile/conjugated diene copolymer comprises a residual carbon-carbon double bond unsaturation of less than about 30 mol percent.

3. The polymer composition according to claim 1, wherein the lithium carbonate is present in an amount of from about 0.5 to about 30 parts by weight per hundred parts by weight of the polymer.

4. The polymer composition according to claim 1, wherein the antioxidant is present in an amount of from about 0.5 to about 4 parts by weight per hundred parts by weight of the polymer.

5. The polymer composition according to claim 1, further comprising at least one carbodiimide, at least one polycarbodiimide or mixtures thereof.

6. The polymer composition according to claim 1, further comprising a filler.

7. The polymer composition according to claim 1, further comprising a vulcanization system.

8. A polymer composition comprising:
   (i) a hydrogenated nitrile polymer wherein the nitrile polymer is selected from the group consisting of hydrogenated nitrile/conjugated diene copolymer, nitrile/conjugated diene copolymer, nitrile/conjugated diene/ethylenically unsaturated monomer terpolymer, hydrogenated nitrile/conjugated diene/ethylenically unsaturated monomer terpolymer, and mixtures thereof;
   (ii) lithium carbonate;
   (iii) an antioxidant selected from the group consisting of 4,4'-bis-(1,1-dimethylbenzyl)-diphenylamine, 4,4'-bis(phenylethyl)-diphenylamine, 4,4'-bis(octyl(-diphenylamine) and 2,2,4-trimethyl-1,2-dishydroquinoline, polymerized;
   (iv) at least one filler;
   (v) a vulcanization system; and
   (vi) optionally at least one carbodiimide, at least one polycarbodiimide or mixtures thereof.

9. A process for producing a polymer vulcanizate comprising the step of vulcanizing a polymer composition according to claim 8.

10. A polymer vulcanizate obtained by the process according to claim 9.

11. A method for improving the hot air aging and aqueous fluid resistance characteristics of a polymer having a main polymer chain derived from
   (ia) at least 30% by weight to 100% by weight based on the polymer of a first monomer which introduces at least one of a secondary carbon and a tertiary carbon to the main polymer chain, and
   (ib) in the range of from 0 to 70% by weight based on the polymer of at least one other monomer,
   comprising the step of admixing said polymer with lithium carbonate and an antioxidant selected from the group consisting of 4,4'-bis-(1,1-dimethylbenzyl)-diphenylamine, 4,4'-bis(phenylethyl)-diphenylamine, 4,4'-bis(octyl(-diphenylamine) and 2,2,4-trimethyl-1,2-dihydroquinoline, polymerized.

12. The method defined in claim 11, wherein the lithium carbonate is present in an amount of from about 0.5 to about 30 parts by weight per hundred parts by weight of the polymer.

13. The method defined in claim 11, further comprising admixing at least one carbodiimide, at least one polycarbodiimide or mixtures thereof with the polymer, the lithium carbonate and the antioxidant.

14. The method defined in claim 11, further comprising admixing at least one filler with the polymer, the lithium carbonate and the antioxidant.

15. The method defined in claims 11, further comprising admixing a vulcanization system with the polymer, the lithium carbonate and the antioxidant.

16. A polymer vulcanizate according to claim 10 having a hot air aging time to maintain at least 50% of its original elongation at break of at least about 504 h at 170° C.

17. A polymer vulcanizate according to claim 16, having a hot air aging time to maintain at least 50% of its original elongation at break of at least about 504 h at 170° C.

* * * * *